United States Patent
Kim et al.

(10) Patent No.: US 10,199,692 B2
(45) Date of Patent: Feb. 5, 2019

(54) COVALENTLY CROSS-LINKED GEL ELECTROLYTES

(71) Applicant: AMTEK RESEARCH INTERNATIONAL LLC, Lebanon, OR (US)

(72) Inventors: Jungseung Kim, Lebanon, OR (US); Robert R. Waterhouse, Lebanon, OR (US); Richard W. Pekala, Corvallis, OR (US); Eric B. Hostetler, Corvallis, OR (US)

(73) Assignee: AMTEK RESEARCH INTERNATIONAL LLC, Lebanon, OR (US)

( * ) Notice: Subject to any disclaimer, the term of this patent is extended or adjusted under 35 U.S.C. 154(b) by 128 days.

(21) Appl. No.: 15/352,383

(22) Filed: Nov. 15, 2016

(65) Prior Publication Data

US 2017/0133720 A1     May 11, 2017

Related U.S. Application Data

(63) Continuation of application No. PCT/US2015/031215, filed on May 15, 2015.
(Continued)

(51) Int. Cl.
*H01M 10/10* (2006.01)
*H01M 2/16* (2006.01)
*H01M 4/14* (2006.01)

(52) U.S. Cl.
CPC ......... *H01M 10/10* (2013.01); *H01M 2/1653* (2013.01); *H01M 2/164* (2013.01);
(Continued)

(58) Field of Classification Search
CPC ......... H01M 10/10; H01M 2300/0088; H01M 2300/0005; H01M 2300/0085
(Continued)

(56) References Cited

U.S. PATENT DOCUMENTS 4,708,981 A   11/1987 Zupancic
5,402,306 A    3/1995 Mayer et al.
(Continued)

FOREIGN PATENT DOCUMENTS

WO    2011133677 A1    10/2011

OTHER PUBLICATIONS

PCT/US2015/031215, International Search Report and Written Opinion, 13 pages, dated Aug. 18, 2015.
(Continued)

*Primary Examiner* — Gary D Harris
(74) *Attorney, Agent, or Firm* — Stoel Rives LLP

(57) ABSTRACT

Proton-conducting gel electrolytes with acid immobilized within a covalently cross-linked polymer network and composites containing the gel electrolytes provide low ionic resistance, minimize acid stratification, and prevent dendrite growth. The gel electrolytes can be formed from monomers dissolved in concentrated sulfuric acid and subsequently covalently cross-linked between the battery electrodes, or the covalently cross-linked gel electrolytes can be formed in water and subsequently exchanged into sulfuric acid. The mechanical properties of these gels can often be enhanced with the addition of silica powder, silica fiber, or other additives. In some cases, the covalently cross-linked gel electrolytes are formed in the presence of a conventional silica-filled polyethylene separator or within a low density fiber mat to provide mechanical reinforcement and controlled spacing between the battery electrodes. The covalently cross-linked gel electrolytes provide low ionic resis-
(Continued)

tance, and increased power capacity of the battery, because the polymer networks can be formed at low concentrations (<20% solids).

17 Claims, 5 Drawing Sheets

Related U.S. Application Data

(60) Provisional application No. 62/130,288, filed on Mar. 9, 2015, provisional application No. 61/993,587, filed on May 15, 2014.

(52) U.S. Cl.
CPC ............ *H01M 2/1606* (2013.01); *H01M 4/14* (2013.01); *H01M 2300/0005* (2013.01); *H01M 2300/0085* (2013.01); *H01M 2300/0088* (2013.01); *H01M 2300/0091* (2013.01)

(58) Field of Classification Search
USPC ......................................................... 429/303
See application file for complete search history.

(56) References Cited

U.S. PATENT DOCUMENTS

| | | | |
|---|---|---|---|
| 6,358,651 | B1 | 3/2002 | Chen et al. |
| 6,523,699 | B1 | 2/2003 | Akita et al. |
| 6,962,959 | B2 | 11/2005 | Kurano et al. |
| 7,119,126 | B2 | 10/2006 | Callahan et al. |
| 2002/0102465 | A1 | 8/2002 | Chen et al. |
| 2004/0266895 | A1* | 12/2004 | Callahan ............ B01D 67/0006 521/27 |

OTHER PUBLICATIONS 15791926.7, Extended European Search Report, dated Sep. 5, 2017, 8 pages.

\* cited by examiner

COVALENTLY CROSS-LINKED GEL ELECTROLYTES

CROSS-REFERENCE TO RELATED APPLICATIONS

This application is a continuation of International Patent Application No. PCT/US2015/031215, filed May 15, 2015, entitled "COVALENTLY CROSS-LINKED GEL ELECTROLYTES" and published as WO 2015/176016, which claims the benefit of U.S. Provisional Patent Application No. 62/130,288, filed Mar. 9, 2015, entitled "COVALENTLY CROSS-LINKED, ACID-RESISTANT POLYMER GELS", as well as U.S. Provisional Patent Application No. 61/993,587, filed May 15, 2014, entitled "COVALENTLY CROSS-LINKED, ACID-RESISTANT POLYMER GELS"; the contents of all of which are hereby incorporated by reference herein in their entirety.

COPYRIGHT NOTICE

© 2016 Amtek Research International LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d).

TECHNICAL FIELD

This disclosure relates to separators for lead-acid battery electrodes and, in particular, to proton-conducting gel electrolytes with an acid immobilized within a covalently cross-linked polymer network for separating electrodes in lead-acid batteries while achieving low ionic resistance.

BACKGROUND INFORMATION

The recombinant cell and the flooded cell are two different types of commercially available lead-acid battery designs that are used in many automotive and industrial (e.g., forklift) applications. Both types include adjacent positive and negative electrodes that are separated from each other by a porous battery separator. The porous separator prevents the adjacent electrodes from coming into physical contact and provides space for an electrolyte to reside. Such separators are formed of materials that are sufficiently porous to permit the electrolyte to reside in the pores of the separator material, thereby permitting ionic current flow between adjacent positive and negative plates.

The first type of lead-acid battery, the recombinant battery, or valve-regulated lead-acid battery, typically has an absorptive glass mat (AGM) separator composed of microglass fibers. While AGM separators provide high porosity (>90%), low ionic resistance, and uniform electrolyte distribution, they are relatively expensive and still do not offer precise control over oxygen transport rate or the recombination process. Furthermore, AGM separators exhibit low puncture resistance that is problematic for two reasons: (1) the incidence of short circuits increases, and (2) manufacturing costs are increased because of the fragility of the AGM sheets. In some cases, battery manufacturers select thicker, more expensive separators to improve the puncture resistance, while recognizing that the ionic resistance increases with thickness.

In the case of a recombinant battery using an AGM, the sulfuric acid is essentially "immobilized" within the three-dimensional glass mat structure, enabling the battery to be positioned without concern of acid spillage. In an alternate version of a recombinant battery, the sulfuric acid is mixed with fumed silica under high shear and temperature to form a mixture that "gels" after injection into a battery containing microporous polyethylene separators between the plates. In this case, a thixotropic gel without chemical cross-links is formed because the silica provides a significant increase in the viscosity of the acid, making it less susceptible to spillage. This latter description is often referred to as a gel battery.

The second type of lead-acid battery, the flooded battery, has only a small portion of the electrolyte absorbed into the separator. The remaining portion of the acid between the electrodes is in a continuous liquid state. Flooded battery separators typically include porous derivatives of cellulose, polyvinyl chloride, rubber, and polyolefins. More specifically, microporous polyethylene separators are commonly used because of their ultrafine pore size, which inhibits dendritic growth while providing low ionic resistance, high puncture strength, good oxidation resistance, and excellent flexibility. These properties facilitate sealing of the battery separator into a pocket or envelope configuration into which a positive or negative electrode can be inserted.

Most flooded lead-acid batteries include polyethylene separators. The term "polyethylene separator" is something of a misnomer because these microporous separators require large amounts of precipitated silica to be sufficiently acid wettable. The volume fraction of precipitated silica and its distribution in the separator generally control its ionic permeability, while the volume fraction and orientation of polyethylene in the separator generally control its mechanical properties. The porosity range for commercial polyethylene separators is generally 50%-60%.

A sub-category of the flooded lead-acid battery is the dry-charged battery. This battery is built, charged, washed and dried, sealed, and shipped without electrolyte. It can be stored for up to 18 months. Before use, liquid electrolyte (acid) is added and the battery is given a conditioning charge. Batteries of this type have a long shelf life. Motorcycle batteries are typically dry charged batteries. The acid between the electrodes and the separator is in a continuous liquid state.

In response to the increased price of lead and new start-stop applications in which the lead-acid battery operates in a partial stage of charge, battery manufacturers are seeking new ways to separate electrodes while achieving low ionic resistance and minimizing acid stratification.

SUMMARY OF THE DISCLOSURE

The disclosed proton-conducting gel electrolyte with an acid immobilized within a covalently cross-linked polymer network, and composites containing the gel electrolyte, can be used to separate lead-acid battery electrodes while achieving low ionic resistance. In some cases, the covalently cross-linked polymer network can be formed from monomers dissolved in acid and subsequently cross-linked using an initiator. In other cases, the covalently cross-linked polymer network is formed in water and then subsequently exchanged with acid. Because the covalently cross-linked polymer networks can be formed at low concentration, they offer low ionic resistance and a polymer network structure that can minimize acid stratification and resist spillage while mitigating dendrite growth.

DETAILED DESCRIPTION

Figure 1:
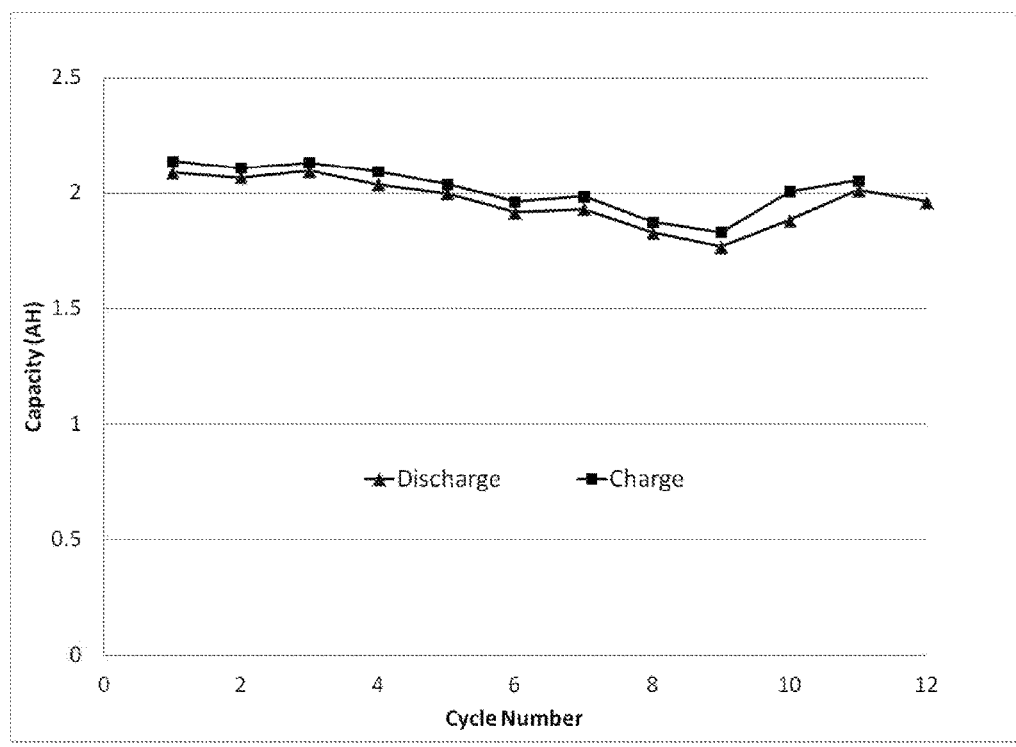
FIG. 1 depicts discharge and charge capacity of a test cell made with an exemplary gel electrolyte.

The following describes the production of proton-conducting gel electrolytes with an acid immobilized within a covalently cross-linked polymer network, and composites containing the gel electrolytes, for use in lead-acid batteries. The gel electrolytes can be formed from monomers dissolved in concentrated acid and subsequently covalently cross-linked between the battery electrodes, or the covalently cross-linked polymer networks can be formed in water and subsequently exchanged into sulfuric acid. In either case, the mechanical properties of the gel electrolytes can often be enhanced with the addition of silica powder, glass fiber, or other additives.

In some cases, composites containing the gel electrolytes are formed in the presence of a conventional silica-filled polyethylene separator or within a low density fiber mat to provide mechanical reinforcement and controlled spacing between the battery electrodes. The gel electrolytes provide low ionic resistance, and increased power capability of the battery, because they can be formed at low concentrations (<20% solids). The covalently cross-linked polymer networks also minimize acid stratification, mitigate dendrite growth, and prevent acid spillage if the battery is placed on its side or if the case is punctured.

The immobilized acid of the disclosed gel electrolytes can be a mineral acid. For example, the mineral acid can be sulfuric acid with a specific gravity of about 1.05 to about 1.83, about 1.18 to about 1.50, or about 1.25 to about 1.40. For example, the sulfuric acid may have a specific gravity of about 1.25 to about 1.35 at the time of formation of the gel electrolyte and when an energy storage device containing the gel electrolyte is fully charged. However, the sulfuric acid may have a specific gravity closer to about 1.1 when an energy storage device having the gel electrolyte is fully discharged.

The polymer network of the disclosed gel electrolytes can have a low concentration in the acid. For example, the mass concentration of the polymer network in the acid can be about 1% to about 40%, about 2% to about 25%, or about 4% to about 12% on a weight-to-weight basis. Segments of the polymer network have reacted polymers, monomers, oligomers, cross-linkers, or combinations thereof. For example, segments of the polymer network can include acrylamide, methacrylamide, vinylpyrrolidone, acrylate, methacrylate, resorcinol, bis-acrylamide, N,N'-diallyltartramide, glyoxal, formaldehyde, or derivatives of any of the foregoing. As discussed above, the polymer network can be formed in acid or formed in water and then exchanged into acid.

As mentioned previously, the gel electrolyte can include an additive to modulate the mechanical, voltage, or flow properties of the gel electrolyte. The additive can include a fiber, salt, colloid, soluble or insoluble powder, particulate, soluble polymer and resins (e.g., phenol-formaldehyde, resorcinol-formaldehyde, poly furfuryl alcohol, and epoxy) not integrated into the polymer network, or a combination thereof. For example, the additive can be silica (fumed, precipitated, colloidal, or surface-modified), alumina, titania, zirconia, zeolites, minerals (e.g., talc, calcium sulfate, clay), metallic sulfates or phosphates (e.g., zinc, tin, indium, barium, aluminum, magnesium, cadmium, and silver), glass (e.g., microspheres, microballoons, or chopped, rotary, or flame-blown fibers), substituted benzaldehydes (e.g., vanillin, salicylaldehyde, anisaldehyde, veratraldehyde, and p-propoxyacetophenone), wood powder, polymer fibers (e.g., polyester, polyimide, nylon, and para-aramid fibers), surfactants, chelating agents, ion exchange materials, cellulose, lignin, lignin sulphonate, chitosan, and cross-linked polyvinylpyrrolidone or rubber (e.g., polyisoprene, styrene-butadiene, ethylene-propylene). Some additives will substantially dissolve in the acid, such as phosphoric acid, boric acid, citric acid, picric acid, vanillin, sodium sulfate, and ionic liquids.

Furthermore, in addition to or instead of an additive, the gel electrolyte can be part of a composite. The composite can include a freestanding porous substrate. The gel electrolyte can be formed at least partially on a surface of the substrate, at least partially within pores of the substrate, or both. Examples of the substrate include a foam, a mat (e.g., a non-woven or woven glass or polymer mat with or without ribs), a sheet, a film (e.g., a polymer film such as silica-filled polyethylene with or without cutouts for gel electrolyte), a web, a membrane, or a combination thereof. "Freestanding" refers to a substrate having sufficient mechanical properties to permit manipulation such as winding and unwinding of the substrate for use in an energy storage device assembly process. To the extent the pores of the substrate are not filled with the gel electrolyte, the pores can be filled with free acid (i.e., non-immobilized acid). Filling the pores with free acid can be performed after the composite has been placed between electrodes (e.g., layers of composite formed outside of a battery, stacked between electrodes during battery assembly, and then free acid added to fill open pores). Furthermore, the composite can include spacers (e.g., dots or ribs) to separate the electrodes. The spacers can be separate or part of the freestanding porous substrate. Alternatively, the spacers can be part of one or more of the electrodes.

The composite can have the benefit of the freestanding porous substrate that can help resist dendritic growth and enhance the mechanical properties of the gel electrolyte. Meanwhile, the gel electrolyte immobilizes the acid, which resists acid stratification and spillage and is position insensitive, can hold the freestanding porous substrate in place, and can prevent electronic conduction (i.e., prevent flow of electrons between electrodes), but have low proton-conduction resistance. For example, the gel electrolyte can prevent electronic conduction that might occur as a result of direct contact between the electrodes, prevent the inclusion of conductive particles between the electrodes, and prevent the growth of lead dendrites that can result from the cycling of a battery at low states of charge.

The disclosed gel electrolyte, and composites containing the gel electrolyte, can be part of an energy storage device. The energy storage device can include a positive electrode and a negative electrode with the gel electrolyte (by itself or as part of a composite) at least partially covering one or both of the electrodes. The gel electrolyte prevents electronic conduction (both direct contact between the electrodes and short circuits) while allowing proton (ionic) conduction.

The energy storage device can include multiple cells of positive and negative electrode combinations with the electrodes at least partially covered by the gel electrolyte. In a lead-acid battery, the positive electrodes are generally made of lead oxide and the negative electrodes are made of a variety of materials, such as lead, carbon, activated carbon, or combinations thereof. Additionally, different negative electrodes in a single energy storage device can be made of different materials.

The positive electrode and the negative electrode of the energy storage device can have plates with the gel electrolyte positioned between the plates. Alternatively, one or both of the positive electrode and the negative electrode can have a tubular or spiral-shape that is at least partially surrounded by the gel electrolyte.

As used herein, "covering," "covered," and "surrounded" encompass both direct and indirect contact. For example, when the gel electrolyte, or composite containing the gel electrolyte, is formed in the presence of electrodes, the electrodes will be in direct contact with the gel electrolyte. However, in another example, if a film or spacer is in direct contact with the electrodes during formation of the gel electrolyte, then the gel electrolyte would cover the electrodes without being in direct contact. Likewise, "at least partially covering (or covered or surrounded)" encompasses covering all or a portion of one or more surfaces of the electrodes. For example, if the gel electrolyte is formed in only a bottom portion of a battery that has electrode plates, and the upper portion of the battery is filled with free acid, then the bottom surfaces of the plates would be partially covered with the gel electrolyte, whether the gel electrolyte is in direct or indirect contact with the bottom surfaces of the plates. In another example, if a composite containing the gel electrolyte is formed with dimensions similar to the faces of the electrodes, and then the composite is positioned between the faces of the electrodes, then the gel electrolyte covers the faces of the electrodes, regardless of whether the gel electrolyte of the composite is in direct or indirect contact with the electrodes.

Methods of forming the proton-conducting gel electrolyte are also disclosed herein. In one variation, monomer, oligomer, cross-linker, polymer, polymer precursor, or combination thereof, is mixed with a liquid phase containing concentrated acid. The monomer, oligomer, cross-linker, polymer, polymer precursors, or combination thereof, is then reacted to form a covalently cross-linked polymer network that immobilizes the liquid phase, thereby forming the gel electrolyte. In another variation, the monomer, oligomer, cross-linker, polymer, polymer precursor, or combination thereof, is mixed with a liquid phase containing water, such as deionized water, without concentrated acid. As with the other variation, the monomer, oligomer, cross-linker, polymer, polymer precursors, or combination thereof, is then reacted to form a covalently cross-linked polymer network that immobilizes the liquid phase. The water is then substantially replaced with concentrated acid, thereby forming the gel electrolyte.

In either variation, additives, a freestanding porous substrate, or both may be present during the reaction. For example, additives can be mixed with the liquid phase and the monomer, oligomer, cross-linker, polymer, polymer precursor, or combination thereof, prior to the reaction.

One of skill in the art, with the benefit of this disclosure, should understand that a number of reactions can be used to form the covalently cross-linked polymer network. For example, monomers can be reacted with cross-linkers to form the covalently cross-linked polymer network, and likewise for oligomers. Some cross-linkers, such as bis-acrylamide, can be reacted by themselves to form the covalently cross-linked polymer network. Alternatively, polymers can be reacted with cross-linkers to form the covalently cross-linked polymer network. Additionally, polymer precursors can be formed and then reacted with cross-linkers to form the covalently cross-linked polymer network.

The reaction can be performed in the presence of electrodes to partially or completely cover the electrodes with the gel electrolyte. For example, one or both of the positive electrodes and the negative electrodes can be placed in a battery casing, the mixture of the monomer, oligomer, cross-linker, polymer, polymer precursors, or combination thereof, and the liquid phase added to the casing, and then performing the reaction in situ in the presence of the electrodes. Likewise, the reaction can be staged and performed in different locations. For example, the monomer, oligomer, cross-linker, polymer, polymer precursors, or combination thereof, can be partially reacted ex situ and then added to the battery casing where the reaction is completed in situ in the presence of the electrodes. Alternatively, the reaction can be performed ex situ and the electrodes later covered with the gel electrolyte. As used herein, "in situ" refers to in contact (direct or indirect) with the electrodes and "ex situ" refers to not in contact with the electrodes. For example, if the electrodes were covered with a temporary film, such as teflon, the gel electrolyte formed surrounding the electrodes, and the temporary film removed (to allow free acid access to the electrode in the device), the reaction would still be considered to have been in situ.

Alternatively, the gel electrolyte, or composite containing the gel electrolyte, can be formed in a mold and later placed in contact with an electrode. The mold could be designed to provide any desired shape and texture of the gel electrolyte, such as channels or ribs on the surface (the resulting spaces would allow free acid to reside between the electrode and the gel electrolyte in the assembled device). Additionally, for composites, the freestanding porous substrate could be placed at an edge of the mold so that the gel electrolyte does not fill all of the pores of the substrate (the pores would allow free acid to reside between the electrode and the gel electrolyte in the assembled device). Alternatively, for composites, the freestanding porous substrate could be centered in the mold, or positioned in some other way, so that the gel electrolyte fills some or all of the pores of the substrate.

An energy storage device with lead electrodes can be constructed with its electrodes in different states prior to the addition of the gel electrolyte (either formed ex situ or in situ). The electrodes can be unformed, formed, or formed and dried (dry-charged). With unformed electrodes, the electrodes are not in a charged state and the formation step can be performed after the introduction of the gel electrolyte (or after introduction of one more components used to form the gel electrolyte). With formed electrodes, the formation step has already occurred and the electrodes are in a charged state when the gel electrolyte is introduced (either formed ex situ or in situ). With dry-charged electrodes, the formation step has already occurred and the electrodes have been dried to permit long term storage of the battery. The gel electrolyte (or one or more components used to form the gel electrolyte) can be introduced to reactivate the battery. For example, a battery with dry-charged electrodes can be shipped to a distributor and then the distributor can form the gel electrolyte in situ in the battery and simultaneously reactivate the electrodes.

Non-limiting examples of the monomers, oligomers, and polymer precursors prior to the reacting step are acrylamide, methacrylamide, acrylic acid, acrylate, methacrylate, resorcinol, N-vinylpyrrolidone, and derivatives of any of the foregoing. Non-limiting examples of derivatives include methyl acrylate, ethyl acrylate, 2-carboxyethyl acrylate, methacrylic acid, hydroxymethyl methacrylate, hydroxyethyl methacrylate, hydroxyethoxyethyl methacrylate, hydroxydiethoxyethyl methacrylate, methoxyethyl methacrylate, methoxyethoxyethyl methacrylate, methoxydiethoxyethyl methacrylate, aminoethyl methacrylate, glyceryl methacrylate, propylene glycol methacrylate, N-isopropylacrylamide, N,N-dimethylacrylamide, N-hydroxyethyl acrylamide, N-(isobutoxymethyl)acrylamide, N-(3-methoxypropyl)acrylamide, and N-[tris(hydroxymethyl)methyl]acrylamide.

Non-limiting examples of the polymers prior to the reacting step are linear polyacrylamide, polymethacrylamide, polyacrylate, polymethacrylate, polyvinylpyrrolidone, or derivatives of any of the foregoing, or copolymers of any of the foregoing.

The cross-linker is a multi-functional molecule, such as a tri- or bi-functional molecule. Non-limiting examples of cross-linkers include bis-acrylamide, N,N'-diallyltartramide, ethylene glycol dimethacrylate, di(ethylene glycol) diacrylate, formaldehyde, and glyoxal. One skilled in the art, with the benefit of this disclosure, should understand that a number of cross-linkers known in the art can be used.

The reaction to form the covalently cross-linked polymer network can be free-radically initiated, such as photochemically or thermally induced. Non-limiting examples of initiators are ammonium persulfate, sodium persulfate, 2,2'-azobis(2-methylpropionitrile), and dicumyl peroxide. One of skill in the art, with the benefit of this disclosure, should understand that a number of known initiators could be used.

Additional advantages of the disclosed gel electrolyte, or composite containing the gel electrolyte, will be apparent from the following examples.

EXAMPLES

The specific ingredients used in these examples are described in Table 1. In the following examples, as set out in Table 2, polymers, monomers, cross-linkers, initiators, and additives were dissolved directly in acids and then cured in an oven to synthesize covalently cross-linked polymer networks by free-radical polymerization that immobilized the acids. Examples 1-19 illustrate synthesis of covalently cross-linked polymer networks from various starting monomers and cross-linkers. Example 20 illustrates synthesis of covalently cross-linked polymer networks using only a cross-linker. Examples 21-27 illustrate synthesis of covalently cross-linked polymer networks from various starting monomers and cross-linkers.

TABLE 1

| Chemical | Vendor | Trade name | Sample information (e.g. purity and MW) | CAS No. | Abbreviation |
|---|---|---|---|---|---|
| 1-Vinyl-2-pyrrolidone | Sigma-Aldrich | | ≥98% | 88-12-0 | VP |
| Acrylamide | Sigma-Aldrich | | ≥99% | 79-06-1 | AAm |
| 2-Hydroxylethyl methacrylate | Sigma-Aldrich | | 97% | 868-77-9 | HEMA |
| Methacrylamide | Sigma-Aldrich | | 98% | 79-39-0 | |
| 2-Acrylamido-2-methyl-1-propanesulfonic acid | Sigma-Aldrich | | 99% | 15214-89-8 | AMPS |
| 3-Sulfopropyl acrylate potassium salt | Sigma-Aldrich | | | 31098-20-1 | SPAK |
| Resorcinol | Sigma-Aldrich | | ≥99% | 108-46-3 | |
| Formaldehyde | Sigma-Aldrich | | 37 wt. % aqueous solution | 50-00-0 | |
| N,N'-Methylenebisacrylamide | Sigma-Aldrich | | 99% | 110-26-9 | MBAm |
| Ethylene glycol dimethacrlyate | Sigma-Aldrich | | 98% | 97-90-5 | EGDMA |
| Di(ethylene glycol) diacrylate | Sigma-Aldrich | | 75% | 4074-88-8 | DEGDA |
| (+)-N,N'-Diallyltartramide | Sigma-Aldrich | | ≥99% | 58477-85-3 | DATD |
| Glyoxal | Sigma-Aldrich | | 40 wt. % in water | 107-22-2 | |
| Ammonium persulfate | Sigma-Aldrich | | ≥98% | 7727-54-0 | APS |
| Sodium persulfate | Sigma-Aldrich | | 98% | 7775-27-1 | SPS |
| 2,2'-Azobis(2-methylpropionitrile) | Sigma-Aldrich | | 98% | 78-67-1 | AIBN |
| Dicumyl peroxide | Sigma-Aldrich | | 98% | 80-43-3 | DCP |
| Riboflavin | Sigma-Aldrich | | ≥98% | 83-88-5 | |
| N,N,N',N'-tetramethylethylene-diamine | Sigma-Aldrich | | 99% | 110-18-9 | TEMED |
| Sodium carbonate | Sigma-Aldrich | | ≥99.5% | 497-19-8 | |
| Sodium sulfate | Sigma-Aldrich | | ≥99% | 7757-82-6 | |
| Vanillin | Solvay | RHOVEA ™ | | 121-33-5 | |
| Boric acid | Sigma-Aldrich | | ≥99.5% | 10043-35-3 | |
| Silicon dioxide nanopowder | Sigma-Aldrich | | 10-20 nm particle size | 7631-86-9 | |

TABLE 1-continued

| Chemical | Vendor | Trade name | Sample information (e.g. purity and MW) | CAS No. | Abbreviation |
|---|---|---|---|---|---|
| Colloidal silica | Sigma-Aldrich | Ludox ®HS-40 | 40% (w/w) suspension in water | 7631-86-9 | |
| Fumed silica | EVONIK | AERODISP ® W7512S | 11-13% (w/w) suspension in water | | |
| Micro-strand fiber | John Manville | | | | |
| Crosslinked polyvinylpyrrolidone | BASF | Luvicross ® | | | PVP |
| Polyvinylpyrrolidone | BASF | Sokalam ® K115 CQ | 10% (w/w) in water | | PVP |
| Polyacrylamide | BASF | ZETAG ®7645 | | | PAAm |
| Polyacrylamide | Sigma-Aldrich | | MW: 100,000 g/mol | 9003-05-8 | PAAm |

TABLE 2

| | Unit | Example 1 | Example 2 | Example 3 | Example 4 |
|---|---|---|---|---|---|
| Monomer | | AAm | AAm | AAm | AAm |
| Amount | g | 0.8 | 1.8 | 2.5 | 1.9 |
| Co-monomer | | | | | |
| Amount | g | | | | |
| Crosslinker | | MBAm | MBAm | MBAm | MBAm |
| Amount | g | 0.9 | 0.3 | 2.7 | 2.0 |
| Initiator | | APS | APS | SPS | AIBN |
| Amount | g | 0.3 | 0.2 | 0.5 | 0.5 |
| Solubilized additive | | | Sodium sulfate | Boric acid | Vanillin |
| Amount | g | | 0.4 | 0.6 | 0.1 |
| Particulate additive | | | | | |
| Amount | g | | | | |
| Solvent | | Sulfuric acid (sp.gr. = 1.28) | Sulfuric acid (sp.gr. = 1.3) | Sulfuric acid (sp.gr. = 1.28) | Sulfuric acid (sp.gr. = 1.28) |
| Amount | g | 64.0 | 17.5 | 64.0 | 40.0 |
| Solid content of gel | % (w/w) | 3.0 | 11.4 | 8.1 | 10.1 |
| Monomer/Co-monomer | mol/mol | | | | |
| Monomer/Crosslinker | mol/mol | 2.0 | 13.0 | 2.0 | 2.1 |
| Monomer/Initiator | mol/mol | 10.1 | 28.9 | 18.1 | 8.8 |
| Additive content of gel | % (w/w) based on total weight | | 2.0 | 0.8 | 0.2 |
| Cure temperature | ° C. | 70.0 | 80.0 | 60.0 | 60.0 |
| Cure time | hr | | 2.0 | | 2.0 |
| Description of Results | | Acid-containing white covalently cross-linked gel | Acid-containing white covalently cross-linked gel | Acid-containing white covalently cross-linked gel | Acid-containing white covalently cross-linked gel |

| | Unit | Example 5 | Example 6 | Example 7 | Example 8 |
|---|---|---|---|---|---|
| Monomer | | AAm | AAm | AAm | AAm |
| Amount | g | 1.8 | 5.1 | 0.7 | 1.9 |
| Co-monomer | | | | | |
| Amount | g | | | | |
| Crosslinker | | MBAm | MBAm | MBAm | MBAm |
| Amount | g | 2.0 | 5.5 | 0.7 | 2.0 |
| Initiator | | APS | APS | APS | APS |
| Amount | g | 0.6 | 0.6 | 0.4 | 0.6 |
| Solubilized additive | | | | | Sodium sulfate |
| Amount | g | | | | 0.4 |
| Particulate additive | | Colloidal silica | Fumed silica | Micro-strand fiber | Nanopowder silica |
| Amount | g | 10.0 | 9.4 | 0.1 | 0.4 |
| Solvent | | Sulfuric acid (sp.gr. = 1.28) | Sulfuric acid (sp.gr. = 1.28) | Sulfuric acid (sp.gr. = 1.28) | Sulfuric acid (sp.gr. = 1.28) |
| Amount | g | 30.0 | 128.0 | 18.7 | 40.0 |
| Solid content of gel | % (w/w) | 18.9 | 8.3 | 9.2 | 10.8 |
| Monomer/Co-monomer | mol/mol | | | | |
| Monomer/Crosslinker | mol/mol | 2.0 | 2.0 | 2.2 | 2.1 |
| Monomer/Initiator | mol/mol | 9.6 | 27.3 | 5.6 | 10.2 |
| Additive content of gel | % (w/w) based on total weight | 9.0 | 0.8 | 0.5 | 1.8 |
| Cure temperature | ° C. | 60.0 | 60.0 | 60.0 | 60.0 |
| Cure time | hr | 1.0 | 1.0 | 1.5 | 1.0 |

TABLE 2-continued

| Description of Results | | Acid-containing white covalently cross-linked gel | Acid-containing white covalently cross-linked gel | Acid-containing white covalently cross-linked gel | Acid-containing white covalently cross-linked gel |
|---|---|---|---|---|---|
| | Unit | Example 9 | Example 10 | Example 11 | Example 12 |
| Monomer | | AAm | AAm | Methacrylamide | Methacrylamide |
| Amount | g | 0.8 | 2.6 | 1.0 | 1.6 |
| Co-monomer | | | | | |
| Amount | g | | | | |
| Crosslinker | | DATD | MBAm | MBAm | DATD |
| Amount | g | 1.2 | 2.8 | 1.0 | 0.4 |
| Initiator | | APS | APS | APS | SPS |
| Amount | g | 0.2 | 0.2 | 0.3 | 0.3 |
| Solubilized additive | | | | | |
| Amount | g | | | | |
| Particulate additive | | | | | |
| Amount | g | | | | |
| Solvent | | Sulfuric acid (sp.gr. = 1.28) | Phosphoric acid (sp.gr. = 1.68) | Sulfuric acid (sp.gr. = 1.28) | Sulfuric acid (sp.gr. = 1.28) |
| Amount | g | 25.6 | 64.0 | 25.6 | 25.6 |
| Solid content of gel | % (w/w) | 8.0 | 8.0 | 8.1 | 8.2 |
| Monomer/Co-monomer | mol/mol | | | | |
| Monomer/Crosslinker | mol/mol | 2.0 | 2.0 | 1.9 | 10.9 |
| Monomer/Initiator | mol/mol | 10.2 | 43.4 | 8.7 | 18.2 |
| Additive content of gel | % (w/w) based on total weight | | | | |
| Cure temperature | ° C. | 60.0 | 70.0 | 60.0 | 60.0 |
| Cure time | hr | | | | |
| Description of Results | | Acid-containing white covalently cross-linked gel | Acid-containing white covalently cross-linked gel | Acid-containing white covalently cross-linked gel | Acid-containing white covalently cross-linked gel |
| | Unit | Example 13 | Example 14 | Example 15 | Example 16 |
| Monomer | | AMPS | AMPS | HEMA | SPAK |
| Amount | g | 3.0 | 1.3 | 2.1 | 7.5 |
| Co-monomer | | | | | |
| Amount | g | | | | |
| Crosslinker | | MBAm | DATD | EGDMA | DEGDA |
| Amount | g | 1.1 | 0.7 | 1.8 | 3.5 |
| Initiator | | APS | APS | APS | SPS |
| Amount | g | 0.3 | 0.2 | 0.7 | 0.7 |
| Solubilized additive | | | | | |
| Amount | g | | | | |
| Particulate additive | | | | | |
| Amount | g | | | | |
| Solvent | | Sulfuric acid (sp.gr. = 1.28) | Sulfuric acid (sp.gr. = 1.28) | Sulfuric acid (sp.gr. = 1.28) | Sulfuric acid (sp.gr. = 1.28) |
| Amount | g | 40.0 | 25.6 | 36.0 | 128.0 |
| Solid content of gel | % (w/w) | 9.9 | 8.0 | 11.3 | 8.4 |
| Monomer/Co-monomer | mol/mol | | | | |
| Monomer/Crosslinker | mol/mol | 2.0 | 2.0 | 1.8 | 2.0 |
| Monomer/Initiator | mol/mol | 11.0 | 9.8 | 5.3 | 11.0 |
| Additive content of gel | % (w/w) based on total weight | | | | |
| Cure temperature | ° C. | 60.0 | 60.0 | 80.0 | 60.0 |
| Cure time | hr | 1.0 | | 2.0 | |
| Description of Results | | Acid-containing white covalently cross-linked gel | Acid-containing transparent covalently cross-linked gel | Acid-containing white covalently cross-linked gel | Acid-containing white covalently cross-linked gel |
| | Unit | Example 17 | Example 18 | Example 19 | Example 20 |
| Monomer | | AAm | AAm | AAm | |
| Amount | g | 1.0 | 2.3 | 1.0 | |
| Co-monomer | | MAAm | AMPS | HEMA | |
| Amount | g | 0.6 | 0.8 | 0.9 | |
| Crosslinker | | MBAm | MBAm | MBAm | MBAm |
| Amount | g | 2.3 | 1.1 | 2.1 | 0.7 |
| Initiator | | APS | APS | APS | APS |
| Amount | g | 0.5 | 0.3 | 0.5 | 0.1 |
| Solubilized additive | | | | | |

TABLE 2-continued

|  | Unit |  |  |  |  |
|---|---|---|---|---|---|
| Amount Particulate additive | g |  |  |  |  |
| Amount Solvent | g | Sulfuric acid (sp.gr. = 1.28) | Sulfuric acid (sp.gr. = 1.28) | Sulfuric acid (sp.gr. = 1.28) | Sulfuric acid (sp.gr. = 1.28) |
| Amount | g | 40.0 | 40.0 | 40.0 | 19.3 |
| Solid content of gel | % (w/w) | 9.9 | 9.9 | 10.1 | 4.1 |
| Monomer/Co-monomer | mol/mol | 2.0 | 8.7 | 2.0 |  |
| Monomer/Crosslinker | mol/mol | 1.4 | 4.9 | 1.5 |  |
| Monomer/Initiator | mol/mol | 9.6 | 26.8 | 9.6 | 10.7 |
| Additive content of gel | % (w/w) based on total weight |  |  |  |  |
| Cure temperature | ° C. | 60.0 | 60.0 | 60.0 | 60.0 |
| Cure time | hr | 1.0 | 1.0 | 1.0 |  |
| Description of Results |  | Acid-containing white covalently cross-linked gel | Acid-containing white covalently cross-linked gel | Acid-containing white covalently cross-linked gel | Acid-containing white covalently cross-linked gel |

|  | Unit | Example 21 | Example 22 | Example 23 | Example 24 |
|---|---|---|---|---|---|
| Polymer |  | PAAm | PAAm | PAAm | PVP |
| Amount | g | 0.5 | 5.0 | 0.6 | 10.7 |
| Monomer |  |  |  |  |  |
| Amount | g |  |  |  |  |
| Crosslinker |  | MBAm | MBAm | Glyoxal | MBAm |
| Amount | g | 0.5 | 2.0 | 0.6 | 0.5 |
| Initiator |  | APS | APS |  | APS |
| Amount | g | 0.1 | 0.9 |  | 0.1 |
| Solvent |  | Sulfuric acid (sp.gr. = 1.28) | Sulfuric acid (sp.gr. = 1.28) | Sulfuric acid (sp.gr. = 1.28) | Sulfuric acid (sp.gr. = 1.28) |
| Amount | g | 19.6 | 40.0 | 20.1 | 10.0 |
| Additive |  |  |  |  |  |
| Amount | g |  |  |  |  |
| Solid | % (w/w) | 5.3 | 16.5 | 4.0 | 8.0 |
| Additive content of gel | % (w/w) based on total solution weight |  |  |  |  |
| Cure temperature | ° C. | 60.0 | 60.0 | 60.0 | 70.0 |
| Cure time | hr |  | 2.0 | 1.0 |  |
| Description of Results |  | Acid-containing white covalently cross-linked gel | Acid-containing white covalently cross-linked gel | Acid-containing transparent covalently cross-linked gel | Acid-containing transparent covalently cross-linked gel |

|  | Unit | Example 25 | Example 26 | Example 27 |
|---|---|---|---|---|
| Polymer |  | Cross-linked PVP | Cross-linked PVP | PVP |
| Amount | g | 5.0 | 5.0 | 28.4 |
| Monomer |  |  |  | AAm |
| Amount | g |  |  | 0.4 |
| Crosslinker |  | MBAm | MBAm | MBAm |
| Amount | g | 2.0 | 2.0 | 0.4 |
| Initiator |  | APS | DCP | APS |
| Amount | g | 0.9 | 0.6 | 0.1 |
| Solvent |  | Sulfuric acid (sp.gr. = 1.28) | Sulfuric acid (sp.gr. = 1.28) | Sulfuric acid (sp.gr. = 1.28) |
| Amount | g | 40.0 | 40.0 | 18.0 |
| Additive |  |  | Vanillin |  |
| Amount | g |  | 0.1 |  |
| Solid | % (w/w) | 16.5 | 16.1 | 8.0 |
| Additive content of gel | % (w/w) based on total solution weight |  | 0.1 |  |
| Cure temperature | ° C. | 60.0 | 60.0 | 70.0 |
| Cure time | hr | 1.0 | 1.0 |  |
| Description of Results |  | Acid-containing white covalently cross-linked gel | Acid-containing white covalently cross-linked gel | Acid-containing white (or translucent) covalently cross-linked gel |

Example 28

Cross-linked Poly(Acrylamide) Gel Prepared using UV Initiation

A covalently cross-linked poly(acrylamide) gel (9% (w/w)) was prepared by UV-induced free radical polymerization of the following solution:
- 0.7 g AAm
- 0.8 g MBAm
- 0.03 g Riboflavin (≥98%; Sigma-Aldrich)
- 0.11 g APS
- 18.4 g Sulfuric acid (sp. gr.=1.28)

The molar ratio of AAm to MBAm and AAm and APS was about 2 to 1 and 22 to 1, respectively. The solution was exposed to UV light using a compact UV lamp (UVL-21; UVP) at room temperature to initiate the polymerization. A yellow covalently cross-linked, acid-immobilized, polymer network was synthesized.

Example 29

Cross-linked Poly(Acrylamide) Gel Prepared Using an Accelerator UV Initiation A covalently cross-linked poly(acrylamide) gel (9% (w/w)) was prepared by UV-induced free radical polymerization of the following solution:
- 0.7 g AAm
- 0.8 g MBAm
- 0.03 g Riboflavin (≥98%; Sigma-Aldrich)
- 0.11 g APS
- 0.14 g TEMED
- 18.4 g Sulfuric acid (sp. gr.=1.28)

The molar ratio of AAm to MBAm and AAm and APS was about 2 to 1 and 22 to 1, respectively. The solution was exposed to UV light using a compact UV lamp (UVL-21; UVP) at room temperature to initiate the polymerization. A yellow covalently cross-linked, acid-immobilized, polymer network was synthesized.

Example 30

Cross-linked Resorcinol-formaldehyde Gel

A covalently cross-linked resorcinol-formaldehyde gel was prepared in deionized water by thermally induced polymerization of the following solution after impregnation of a 100 mm wide×150 mm long×4 mm thick glass fiber needle mat (Type G 300, Evalith™, Johns Manville):
- 4.4 g Resorcinol (≥99%; Sigma Aldrich)
- 6.4 g Formaldehyde (37 wt. % aqueous solution; 10%-15% MeOH; Sigma Aldrich)
- 2.0 g 0.1 M sodium carbonate (≥99.5%; Sigma Aldrich)
- 62.8 g DI water.

The solution contained a 200:1 molar ratio of resorcinol to sodium carbonate initiator with 9% (w/w) solids. The glass fiber needle mat was soaked into the resorcinol-formaldehyde solution for 10 minutes. It was then placed within a sealed plastic container and heated for 3 hours at 90° C. to form a red covalently cross-linked polymer network within the glass fiber mat. This covalently cross-linked polymer gel composite was then cooled to room temperature and placed in a sulfuric acid (sp. gr.=1.3) bath. The covalently cross-linked polymer network composite was exchanged multiple times with sulfuric acid to demonstrate that there was no adverse effect on the composite.

Example 31

A Test Cell with a Cross-linked Poly(Acrylamide) Electrolyte

A test was prepared for use with a covalently cross-linked gel electrolyte as follows. Positive and negative electrodes were harvested from a 6 volt AGM lead-acid battery (Powersonic 6100F). Lead wires were soldered to the tabs of the harvested electrodes and the electrodes were assembled into a single cell test battery with polycarbonate plates and an EPDM rubber gasket, 3/32 inch thick, to provide the spacing between the electrodes. The polycarbonate plates were milled to have a shallow cavity for acid on the outside of the electrode and holes for bolting the cell together. The bolted assembly, with the electrodes in place, was filled with sulfuric acid of 1.28 specific gravity, placed in a bell jar and evacuated for 10 minutes to remove trapped gas and ensure that the electrodes were filled with acid prior to adding the gel. This acid was poured out of the cell just before the gel was added.

The covalently cross-linked poly(acrylamide) gel (8% (w/w)) electrolyte for the test cell was prepared in sulfuric acid by thermally induced, free radical polymerization of the following solution:
- 2.64 g AAm
- 2.87 g MBAm
- 0.06 g APS
- 64.29 g Sulfuric acid (sp. gr.=1.28)

The molar ratios of AAm to MBAm and AAm to APS were about 2 to 1 and 141 to 1, respectively. The white covalently cross-linked polymer network was prepared by dissolving the AAm and MBAm in sulfuric acid and heating to 63° C. in a water bath before adding the APS. This pre-gel solution was held for a time of 30 seconds after the addition of the APS to allow initial cross-linking and polymerization reactions to occur. The pre-gel solution was then poured rapidly into the test cell, emptied of acid as described above. A continuous white gel formed rapidly in the cell, between the Pb (negative) and PbO$_2$ (positive) electrodes and in the cavities between the electrodes and the polycarbonate plates, as the polymerization and cross-linking reactions went to completion. The acid between and around the electrodes was completely immobilized. No free acid was visible above or around the gel electrolyte.

Example 32

Cycle Testing of the Test Cell Made in Example 31

The test cell made with the gel electrolyte in example 31 was connected to power and sense leads from a battery test system (MACCOR model 4000, MACCOR Inc., Tulsa, Okla.). The test cell was cycled as follows:

Charged at 0.4 A current to 2.45V, then held at 2.45V until the current dropped to 0.03 A.

Discharged at 0.5 A current for 15 minutes followed by a 30 second pulse to 1.0 A then 0.5 A to a final end of discharge voltage of 1.7V.

The test cell was cycled 12 times, resulting in a discharge capacity of between 1.77 and 2.10 ampere-hours (Ah), as depicted in FIG. 1.

Example 33

Polarization Test of Test Cell Made in Example 31

Figure 2:
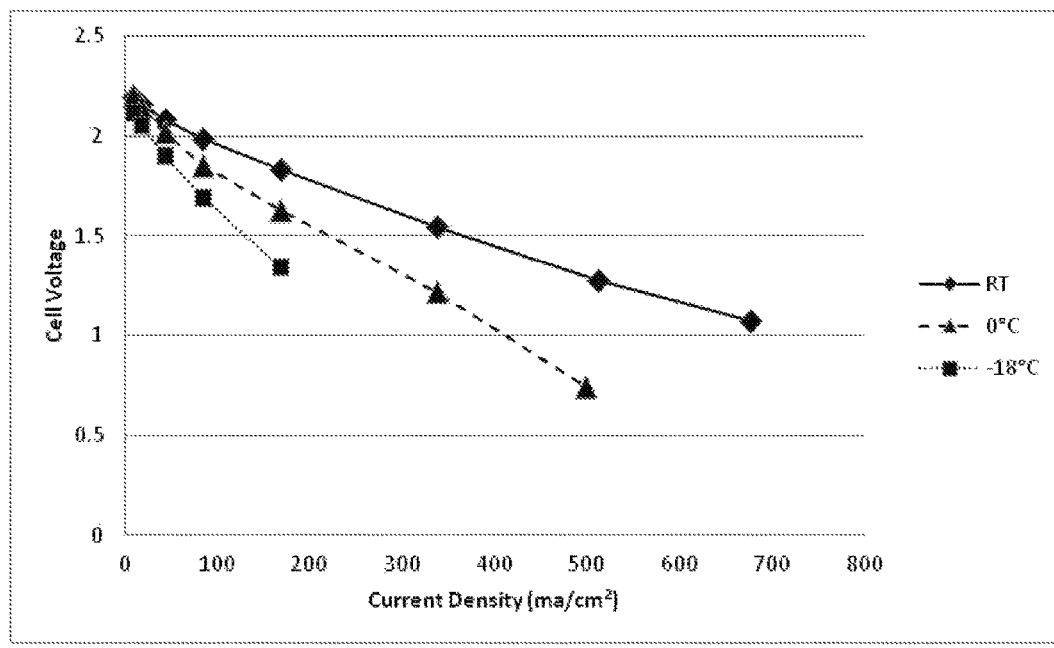
FIG. 2 depicts polarization curves of the test cell used to generate the data depicted in FIG. 1.

The test cell made with the gel electrolyte in example 31 was placed inside an environmental chamber (Tenney Junior, Thermal Product Solutions, New Columbia, Pa.) and connected to the power and sense leads from the battery test system (MACCOR model 4000, MACCOR Inc., Tulsa, Okla.). The temperature of the chamber was equilibrated at 30° C. for one hour, and the test cell was fully charged as in the cycle test of example 32. The test cell was then discharged for short (5 second) pulses at increasing rates of current, from 0.24 to 19.3 A, corresponding to a current density range of from 8.4 to 675 ma/cm$^2$ of the facing sides of the two electrodes. A rest of 10 minutes was allowed between each pulse. This procedure was repeated with the environmental chamber equilibrated at 0° C. and again at −30° C. These tests resulted in a family of polarization curves (FIG. 2) showing the battery to have low resistance and good transport characteristics, even at the highest current.

Comparative Example 1

Test Cell Made with AGM

A test cell was made using the same electrodes and the same bolted polycarbonate and EPDM rubber hardware described in example 31, except the spaces between and outside the electrodes was occupied by an AGM separator (Yingkou Zhongjie Shida Separator Co. Ltd.) with a free-standing thickness of 2.02 mm and basis weight of 292 g/m$^2$. The bolted assembly was filled with sulfuric acid of 1.28 specific gravity, placed in a bell jar and evacuated for 10 minutes to remove trapped gas and ensure that the electrodes were filled with acid. The resulting test cell, with the pore spaces of the electrodes and of the AGM filled with acid was then ready for electrical testing.

Comparative Example 2

Cycle Test of Test Cell Made in Comparative Example 1

The test cell made with the AGM of comparative example 1 was connected to power and sense leads from a battery test system (MACCOR model 4000, MACCOR Inc., Tulsa, Okla.). The test cell was cycled as follows:

Charged at 0.4 A to 2.45V, then held at 2.45V until the current dropped to 0.03 A.

Discharged at 0.5 A for 15 minutes followed by a 30 second pulse to 1.0 A then 0.5 A to 1.7V.

Figure 3:
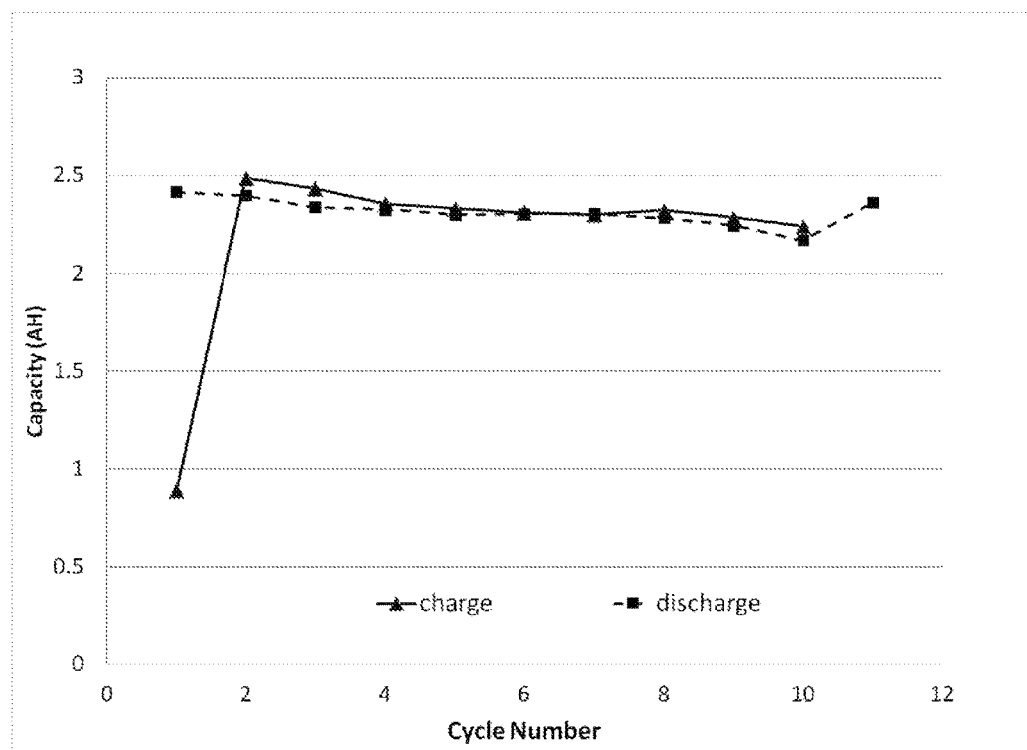
FIG. 3 depicts discharge and charge capacity of a comparative test cell not made with gel electrolyte.

The test cell was cycled 11 times, resulting in a discharge capacity of between 2.17 and 2.42 ampere-hours (Ah), as depicted in FIG. 3.

Comparative Example 3

Polarization Test of Test Cell Made in Comparative Example 1

Figure 4:
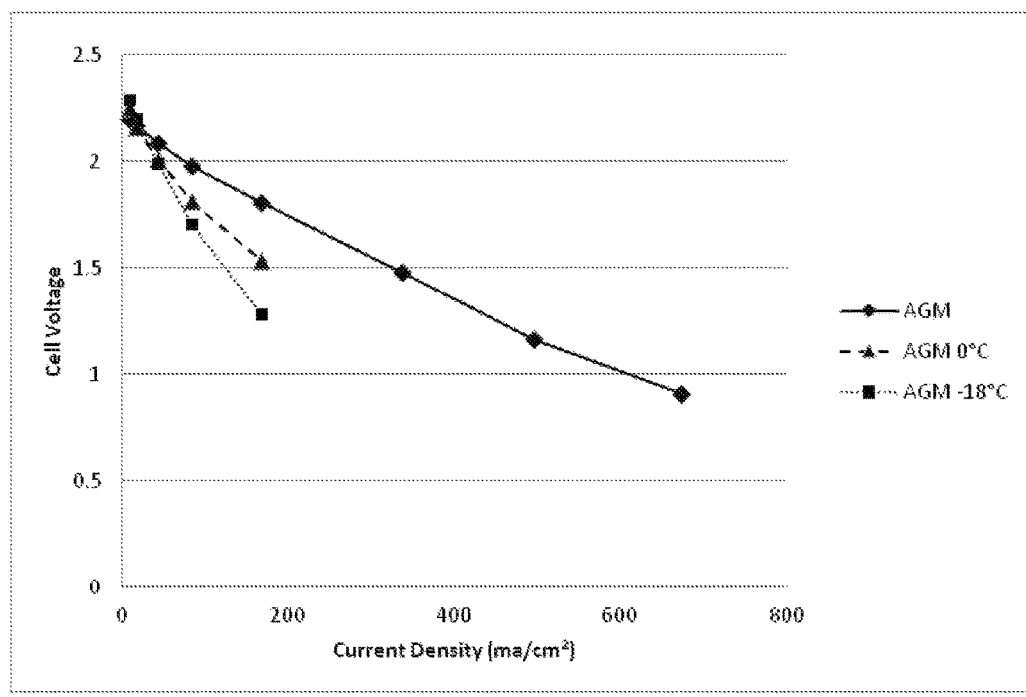
FIG. 4 depicts polarization curves of the comparative test cell used to generate the data depicted in FIG. 3.
Figure 5:
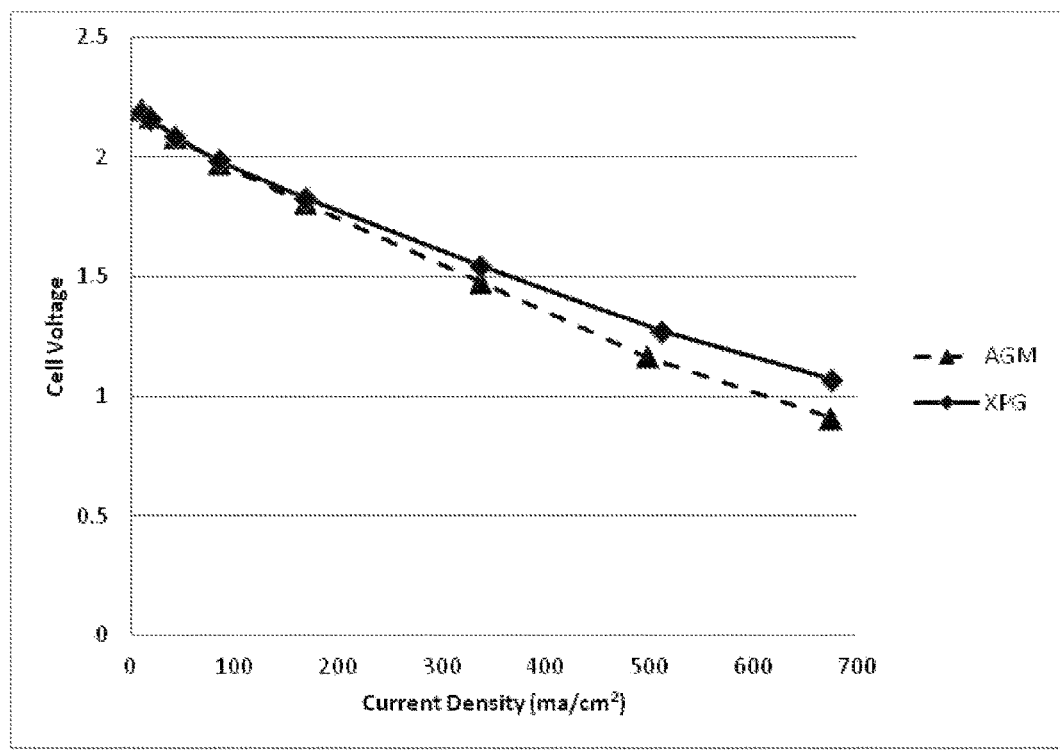
FIG. 5 depicts an overlay of the room temperature polarization curves from FIG. 2 and FIG. 4.

The test cell made with AGM in comparative example 1 was placed inside an environmental chamber and connected to the power and sense leads from the battery test system. The temperature of the chamber was equilibrated at 30° C. for one hour, and the test battery was fully charged as in the cycle test of comparative example 2. The battery was then discharged for short (5 second) pulses at increasing rates of current, from 0.24 to 19.3 A, corresponding to a current density range of from 8.4 to 675 ma/cm$^2$ for the facing sides of the two electrodes. A rest of 10 minutes was allowed between each pulse. This procedure was repeated with the environmental chamber equilibrated at 0° C. and at −30° C. These tests resulted in a family of polarization curves (FIG. 4) showing the battery to have resistance and transport characteristics that were good but slightly poorer than the single cell filled with the covalently cross-linked acid gel electrolyte from example 31. FIG. 5 overlays the polarization curves at 30° C. of the exemplary covalently cross-linked gel electrolyte test cell depicted in FIG. 2 (XPG) and the comparative AGM test cell depicted in FIG. 4 (AGM). This illustrates the low ionic resistance of the covalently cross-linked gel electrolyte.

Example 34

12V SLI Battery Containing Cross-linked Poly(Acrylamide) Gel Electrolyte Using Single-step Formation A 12V Group 35 SLI lead acid battery containing a covalently cross-linked poly(acrylamide) gel electrolyte was prepared using a single-step formation process. The gel was prepared by free radical polymerization of a monomer solution by addition of an initiator solution. Each batch of the monomer solution was prepared by dissolving 29.1 g AAm and 31.5 g MBAm in 2.5 L of 1.26 specific gravity sulfuric acid. Each batch of initiator solution was prepared by dissolving 8.7 g APS and 6.6 g sodium sulfate in 1.5 L 1.26 specific gravity sulfuric acid.

Group 35 batteries, containing 6 books of electrodes with each book containing 6 positive electrodes and 5 negative electrodes, were obtained before the books were welded together. Polyethylene separator envelopes were removed from the positive electrodes and replaced with sheets of porous glass mat (Johns Manville B25) that were folded over each negative electrode to prevent short circuiting in the battery before the formation of gel. The battery was tested for short circuits, and the books were welded together in series.

A mixture of 587 mL of monomer solution and 113 mL of initiator solution were added to each cell of the dry unformed battery. After several minutes, a white covalently cross-linked polymer network was formed. The gel electrolyte battery was formed at constant current.

The battery was tested by starting a Mazda 3 vehicle, which it did numerous times.

Example 35

12V SLI Battery Containing Cross-linked Poly(Acrylamide) Gel Electrolyte Using Two-step Formation A 12V Group 35 SLI lead acid battery containing a cross-linked poly(acrylamide) gel electrolyte was prepared using a two-step formation process. In this method, solutions were made using the same amount of AAm, MBAm, APS, sodium sulfate and sulfuric acid listed in example 34. The sulfuric acid used for the two-step process in this example had a specific gravity of 1.28.

The dry battery was prepared using the glass mat (Johns Manville B25) as described in example 34. Sulfuric acid of 1.26 specific gravity was added to each cell and the battery was formed using a constant current formation process. After formation the 1.26 specific gravity acid was poured out of the battery and then a mixture of 587 mL of monomer solution and 113 mL of initiator solution were added to each cell. After several minutes, a white covalently cross-linked polymer network was formed.

The gel electrolyte battery was tested by starting a Mazda 3 vehicle, which it did numerous times.

The invention claimed is:

1. A proton-conducting gel electrolyte comprising an acid immobilized within a covalently cross-linked polymer network, wherein the polymer network is directly formed in proton-conducting acidic electrolyte comprising sulfuric acid with a specific gravity of about 1.18 to about 1.50, and the resulting gel electrolyte does not flow under shear or at elevated temperature.

2. The gel electrolyte of claim 1, wherein a mass concentration of the polymer network is about 1% to about 40%, on a weight-to-weight basis.

3. The gel electrolyte of claim 1, wherein segments of the polymer network comprise reacted acrylamide, methacrylamide, vinylpyrrolidone, acrylate, methacrylate, bis-acrylamide, N,N'-diallyltartramide, 2-acrylamido-2-methyl-1-propanesulfonic acid, or derivatives of any of the foregoing.

4. The gel electrolyte of claim 1, further comprising an additive that includes a fiber, salt, colloid, soluble or insoluble powder, particulate, soluble polymer not integrated into the polymer network, or combination thereof.

5. A composite, comprising:
a freestanding porous substrate with a proton-conducting gel electrolyte comprising an acid immobilized within a covalently cross-linked polymer network formed at least partially on a surface of the substrate, at least partially within pores of the substrate, or both, wherein the polymer network is directly formed in proton-conducting acidic electrolyte comprising sulfuric acid with a specific gravity of about 1.18 to about 1.50, and the resulting gel electrolyte does not flow under shear or at elevated temperature.

6. The composite of claim 5, wherein the freestanding porous substrate comprises a foam, a mat, a sheet, a film, a web, a membrane, a non-woven mat, or combination thereof.

7. The composite of claim 5, further comprising free acid in at least some of the pores of the substrate not filled with the gel electrolyte.

8. The composite of claim 5, further comprising a pattern or profile on outer surfaces of the composite.

9. An energy storage device, comprising:
a positive electrode;
a negative electrode; and
the proton-conducting gel electrolyte of claim 1, wherein the gel electrolyte prevents electronic conduction while allowing proton conduction, and wherein the gel electrolyte at least partially covers one or both of the electrodes.

10. The energy storage device of claim 9, in which free acid is present between at least some portion of the gel electrolyte and one or both of the electrodes.

11. A method of forming a proton-conducting gel electrolyte, the method comprising:
mixing a monomer, an oligomer, a cross-linker, a polymer, a polymer precursor, or combination thereof, with a liquid phase comprising proton-conducting acidic electrolyte comprising sulfuric acid with a specific gravity of about 1.18 to about 1.50; and
reacting the monomer, oligomer, cross-linker, polymer, polymer precursor, or combination thereof, to form a covalently cross-linked polymer network that immobilizes the liquid phase, thereby forming a gel electrolyte that does not flow under shear or at elevated temperature.

12. The method of claim 11, further comprising reacting the monomer, oligomer, cross-linker, polymer, polymer precursor, or combination thereof, in the presence of a freestanding porous substrate, whereby the gel electrolyte is formed at least partially on a surface of the substrate, at least partially within pores of the substrate, or both.

13. The method of claim 11, further comprising at least partially covering an electrode with the gel electrolyte.

14. The method of claim 13, further comprising partially reacting the monomer, oligomer, cross-linker, polymer, polymer precursor, or combination thereof, ex situ and then completing the reacting in situ in the presence of the electrode to at least partially cover the electrode with the gel electrolyte formed thereby.

15. The method of claim 13, further comprising completely reacting the monomer, oligomer, cross-linker, polymer, polymer precursor, or combination thereof, in situ in the presence of the electrode to at least partially cover the electrode with the gel electrolyte formed thereby.

16. The method of claim 13, further comprising completely reacting the monomer, oligomer, cross-linker, polymer, polymer precursor, or combination thereof, ex situ to thereby form the gel electrolyte, and then at least partially covering the electrode with the gel electrolyte.

17. The method of claim 11, further comprising mixing an additive with the liquid phase and the monomer, oligomer, cross-linker, polymer, polymer precursor, or combination thereof, prior to the reacting step.

* * * * *